United States Patent
Ishida

(10) Patent No.: US 8,320,668 B2
(45) Date of Patent: Nov. 27, 2012

(54) IMAGE PROCESSING APPARATUS AND IMAGE PROCESSING METHOD

(75) Inventor: Yoshihiro Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 12/640,191

(22) Filed: Dec. 17, 2009

(65) Prior Publication Data

US 2010/0158365 A1    Jun. 24, 2010

(30) Foreign Application Priority Data

Dec. 19, 2008 (JP) ................. 2008-324476

(51) Int. Cl.
  *G06K 9/36* (2006.01)
  *G06K 9/00* (2006.01)
  *G06K 9/34* (2006.01)

(52) U.S. Cl. .................. 382/166; 382/167; 382/175

(58) Field of Classification Search .................. 382/166, 382/167, 175
See application file for complete search history.

(56) References Cited

U.S. PATENT DOCUMENTS

| | | | |
|---|---|---|---|
| 5,933,249 A | 8/1999 | Shimura et al. | |
| 5,936,674 A * | 8/1999 | Kim | 375/240.24 |
| 6,192,155 B1 * | 2/2001 | Fan | 382/232 |
| 7,133,565 B2 * | 11/2006 | Toda et al. | 382/243 |
| 7,489,830 B2 * | 2/2009 | Bloomberg et al. | 382/269 |
| 7,672,498 B2 * | 3/2010 | Jellus | 382/131 |
| 7,715,640 B2 * | 5/2010 | Ozawa | 382/239 |
| 7,970,225 B2 * | 6/2011 | Ozawa | 382/239 |
| 8,111,913 B2 * | 2/2012 | Dunn et al. | 382/162 |
| 2006/0045386 A1 | 3/2006 | Fukuoka et al. | |
| 2007/0147703 A1 * | 6/2007 | Watson et al. | 382/284 |

FOREIGN PATENT DOCUMENTS

| | | |
|---|---|---|
| JP | 2002-077633 A | 3/2002 |
| JP | 3376129 B2 | 2/2003 |
| JP | 2004-265384 A | 9/2004 |
| JP | 2006-093880 A | 4/2006 |
| JP | 2008-028717 A | 2/2008 |

* cited by examiner

*Primary Examiner* — Bhavesh Mehta
*Assistant Examiner* — Utpal Shah
(74) *Attorney, Agent, or Firm* — Canon USA, Inc., I.P. Division

(57) ABSTRACT

Noise does not occur even if an image of an object region extracted from an input image and a background image are stored separately, and then displayed or printed, at a boundary portion of the object region. A boundary region is set at the inner side of the object region of the input image, and a pixel value of an adjacent pixel at the outer side of the boundary of the object region is written to a corresponding pixel in the boundary region. Even if a difference occurs between the background image and the object image, when a document file is displayed or printed, since the pixel value of the pixel at the outer side of the object region is assigned to the pixel in the boundary region, noise due to average color does not occur.

11 Claims, 6 Drawing Sheets

IMAGE PROCESSING APPARATUS AND IMAGE PROCESSING METHOD

BACKGROUND OF THE INVENTION

1. Field of the Invention

The present invention relates to an image processing method used for compressing a color document image, and an image processing apparatus.

2. Description of the Related Art

In recent years, along with the popularization of computerized information, systems that do not store paper documents are becoming popular. Such systems store documents electronically after computerizing them. For example, a scanner scans a paper document and transmits the obtained electronic data to other apparatuses. In order to reduce the amount of data transmitted, there has been a demand for compressing the electronic documents with higher compressibility. It is also important that the electronic data is capable of being partially edited and reused, and further has high image quality that is not easily deteriorated even if the document is enlarged or reduced.

However, in a case when a document image includes a text region as well as a photo region, if compression that is appropriate for the text region is performed, then an image of good quality but with low compression rate is obtained. On the other hand, if compression that is appropriate for the photo region is performed, then an image of high compression rate but with deteriorated characteristics is obtained. Thus, there is proposed a technique by which the electronic document image is divided into a text region and a photo region, and then the data of each region is converted by a different method.

For example, Japanese Patent Application Laid-Open No. 2004-265384 discusses a technique for generating a high-image-quality document image that is reusable and can be compressed at a high compression. According to this technique, a text region is converted into vector data since reusability and image quality is important to the text region. Regions other than the text region, such as a photo region, are not appropriately reproduced when they are vectorized. Such regions are thus compressed using JPEG compression. Accordingly, the vector data and the compressed data obtained from each region are synthesized and a high-image-quality document image that is reusable and that can be compressed at a high compression rate is obtained.

Further, Japanese patent No. 3376129 discusses a technique used for dividing an image into a text region (two-color region) and a natural image region (multicolor region), clipping each of the divided regions, filling the clipped regions in the image with substitute pixel data, and then performing binary coding of the clipped text region and multivalue coding of the clipped natural image region, respectively. In filling the clipped region with substitute pixel data, a mean value of pixels near the clipped region or pixel values of the pixels immediately before the clipped region in the scanning order are used.

By filling the clipped region, negative effects to image quality can be reduced. Additionally, coding efficiency of the filling-completed background portion can be improved.

A document file including a compressed background image and a partial image that are obtained according to the above-described technique will now be described. The compressed background image is obtained by clipping a partial region, such as a photo region or a text region, from an original image being a background image and filling the clipped partial region with pixels whose pixel values are mean values of the pixels that neighbor the clipped region.

When such a document file is displayed on a screen of a computer, in some cases a framing boundary streak of a color different from the colors of the pixels adjacent to the clipped region or pixels in the clipped partial region is observed. The boundary is formed by the image of the partial region displayed over the background image. Further, even if the image is not edited, if the display magnification is changed, a boundary streak formed by inconsistent colors may appear.

The framing boundary streak on the boundary may become thicker or thinner regardless of the magnification. This is considered to occur if the display magnification of the document file is changed and when the image of the partial region and the background image are enlarged or reduced separately and then the image of the partial region is superposed on the background image.

In other words, according to the magnification, the relative position of the partial region image that is superposed on the background image is slightly misaligned due to, for example, rounding error of the magnification. On the other hand, when the clipped partial region is filled with pixels having mean values of the pixels adjacent to the clipped region, and if the neighboring pixels are of various colors, the difference between the mean value and the value of the neighboring pixels will be greater.

Thus, if the display position of the partial region image is misaligned and moved from the original position due to, for example, a rounding error, pixels having a color of a mean value of the pixel values of the neighboring pixels that are used in the filling (i.e. false color) are displayed, and the pixels appear as a framing boundary streak of the partial region.

Further, the occurrence of this phenomenon is not limited to when the image is displayed on a display and a similar phenomenon occurs when the image is printed by a printer. Such a noise may cause a deteriorated display image and printed image.

As described above, Japanese patent No. 3376129 discusses a technique by which a clipped region is filled using pixel values of the pixels immediately before the clipped region in the scanning order of each scanning line. After the method is executed, the pixel values of the pixels in the clipped region may be different for each scanning line.

For example, FIG. 3 illustrates a background image 300 and a boundary 301 of a clipped region. The scanning direction is horizontal as can be seen from a scanning direction 302. In this state, the clipped region is filled with pixel values of pixels 303, which are the values of the pixels immediately before the clipped region on the each scanning line. For example, if the pixel values of the pixels 303 are a, b, c, d, e, . . . , x, . . . , and n, then the pixels of each scanning line in the clipped region will be filled with each of the pixel values of the pixels 303 on the same scanning line.

If a user displays such a document file and moves the clipped region when the user edits the document, the region that is filled according to the filling processing and in the background image comes out. At this time, if the pixel values of the pixels 303 include various pixel values, horizontal streaks in the horizontal direction will be seen in the background image. Consequently, an unnatural image will be displayed. Further, the streaks may lower the image compression rate.

SUMMARY OF THE INVENTION

The present invention is directed to an image processing apparatus and an image processing method that are useful in limiting occurrence of noise at a boundary portion of an object region when an input image is displayed or printed, even if the object region such as a photo image is extracted from the input image, and the image of the object region and a background image are separately stored.

According to an aspect of the present invention, an image processing apparatus includes a region division unit configured to extract an object region from an input image, a filling color generation unit configured to generate a filling color of the object region, a filling unit configured to perform filling processing of the object region of the input image using the generated filling color, a boundary region setting unit configured to set a boundary region at an inner side of a boundary of the object region of the input image, an adjacent pixel value writing unit configured to write a pixel value of an adjacent pixel at an outer side of the boundary of the object region to a corresponding pixel in the boundary region, and an output unit configured to output a document file having a data structure including the input image having the pixel value of the adjacent pixel written to each pixel in the boundary region out of the object region and having the pixel value of the filling color written to each pixel in a region set at the inner side of the boundary region and an image of the object region.

According to an exemplary embodiment of the present invention, the background image has a boundary region set at the inner side of the object region, and a pixel value of a pixel that is directly adjacent to and on the outer side of the object region is assigned to each pixel in the boundary region. Thus, in displaying or printing a document file, even if a difference occurs between the background image and the object image, since a pixel value of a pixel that is directly adjacent to and on the outer side of the object region is assigned to the boundary region, noise due to average color does not occur.

Further, since a region that is surrounded by the boundary region of the object region in the background image is filled with one average color, streaks does not occur in the object region, and compression efficiency when compression processing is performed will be increased.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
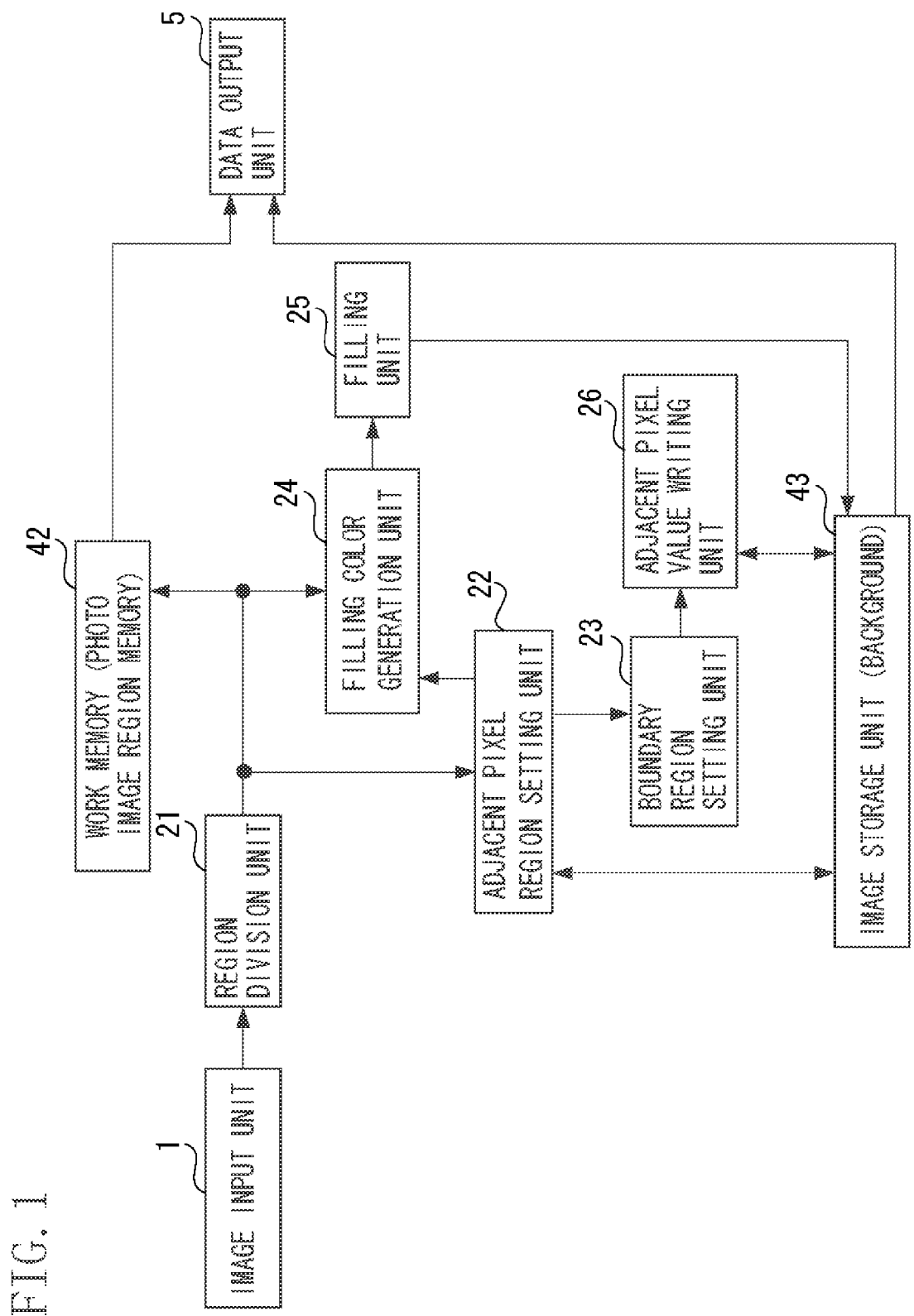
FIG. 1 is a function block diagram of an image processing apparatus according to a first exemplary embodiment of the present invention.

Various exemplary embodiments, features, and aspects of the invention will be described in detail below with reference to the drawings.

Filling processing of an object region (rectangular partial region such as a photo image) using an image processing apparatus according to the present exemplary embodiment will now be described in detail referring to the drawings.

FIG. 1 is a function block diagram illustrating a configuration of an image processing apparatus according to a first exemplary embodiment of the present invention. In FIG. 1, an image input unit 1 inputs a color document image as an input image. The image input unit 1 can be a scanner that obtains a color document image by scanning a paper document or an interface unit that receives a color document image from an external apparatus.

A region division unit 21 performs region division processing of the color document image that is input by the image input unit 1 and extracts a position of the object region. Although, an example of extracting a rectangle region, which includes a photo image, as an object region is described according to the present embodiment, the object region that is extracted is not limited to a photo image, and a rectangle region having other attributes such as an illustration image or a character image may also be extracted as the object region.

An adjacent pixel region setting unit 22 sets an adjacent pixel region including pixels located in the vicinity of the object region but not included in the rectangular object region that is extracted by the region division unit 21. A boundary region setting unit 23 sets a boundary region (zonal region) in the object region of the input image and in the boundary of the object region.

A filling color generation unit 24 determines a color to be used in filling the object region. More specifically, based on a result obtained from the region division unit 21 and the adjacent pixel region set by the adjacent pixel region setting unit 22, pixel values of the pixels neighboring the extracted object region are obtained, and the colors to be used in filling the region corresponding to the object region is determined. A filling unit 25 fills the region corresponding to the object region in the input image with the color generated by the filling color generation unit 24.

An adjacent pixel value writing unit 26 writes a pixel value of each pixel in the adjacent pixel region, which is set by the adjacent pixel region setting unit 22, in the boundary region (zonal region) of the object region set by the boundary region setting unit 23.

A work memory 42, which is also referred to as a "photo image region memory", is used for storing image data of the image in the object region that is extracted by the region division unit 21. An image storage unit 43 stores a background image. This background image is generated based on the image input by the image input unit 1, in which the region corresponding to the object region is filled with a filling color by the filling unit 25, and further the adjacent pixel values are written in the boundary region by the adjacent pixel value writing unit 26.

Further, the image storage unit 43 can be used as a work memory when the filling unit 25 performs the filling processing or the adjacent pixel value writing unit 26 performs the writing processing.

Further, a data output unit 5 generates and outputs layer-structured image information. The layer-structured image information includes an object layer including image data (photo image data) in the object region stored in the work memory 42 and a background image layer including an image that is obtained by the filling unit 25 by performing the filling processing and by the adjacent pixel value writing unit 26 by performing the pixel value writing processing of the portion corresponding to the object region.

Figure 2:
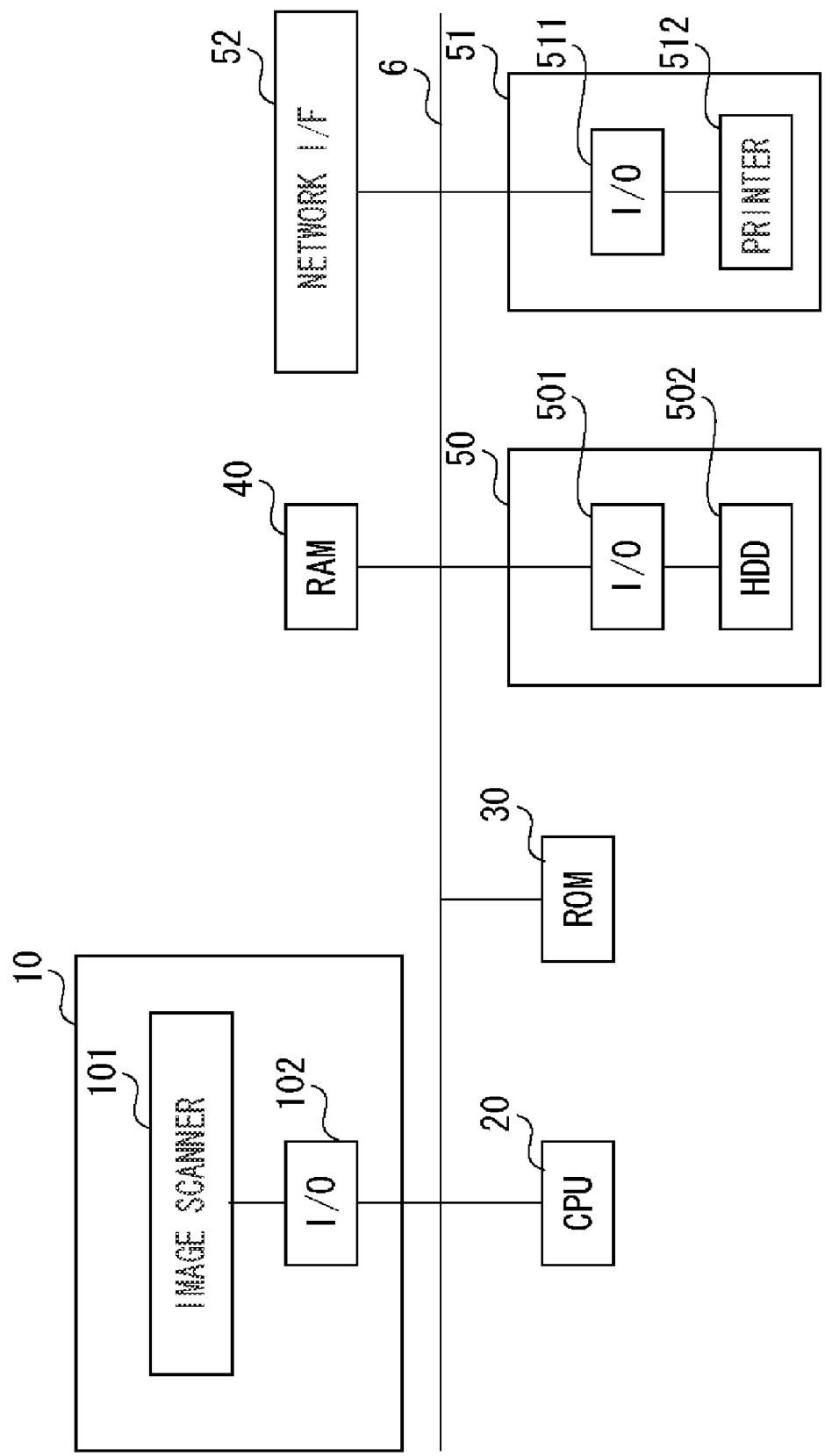
FIG. 2 is a block diagram illustrating a configuration of a major portion of the image processing apparatus illustrated in FIG. 1 according to an exemplary embodiment of the present invention.
Figure 3:
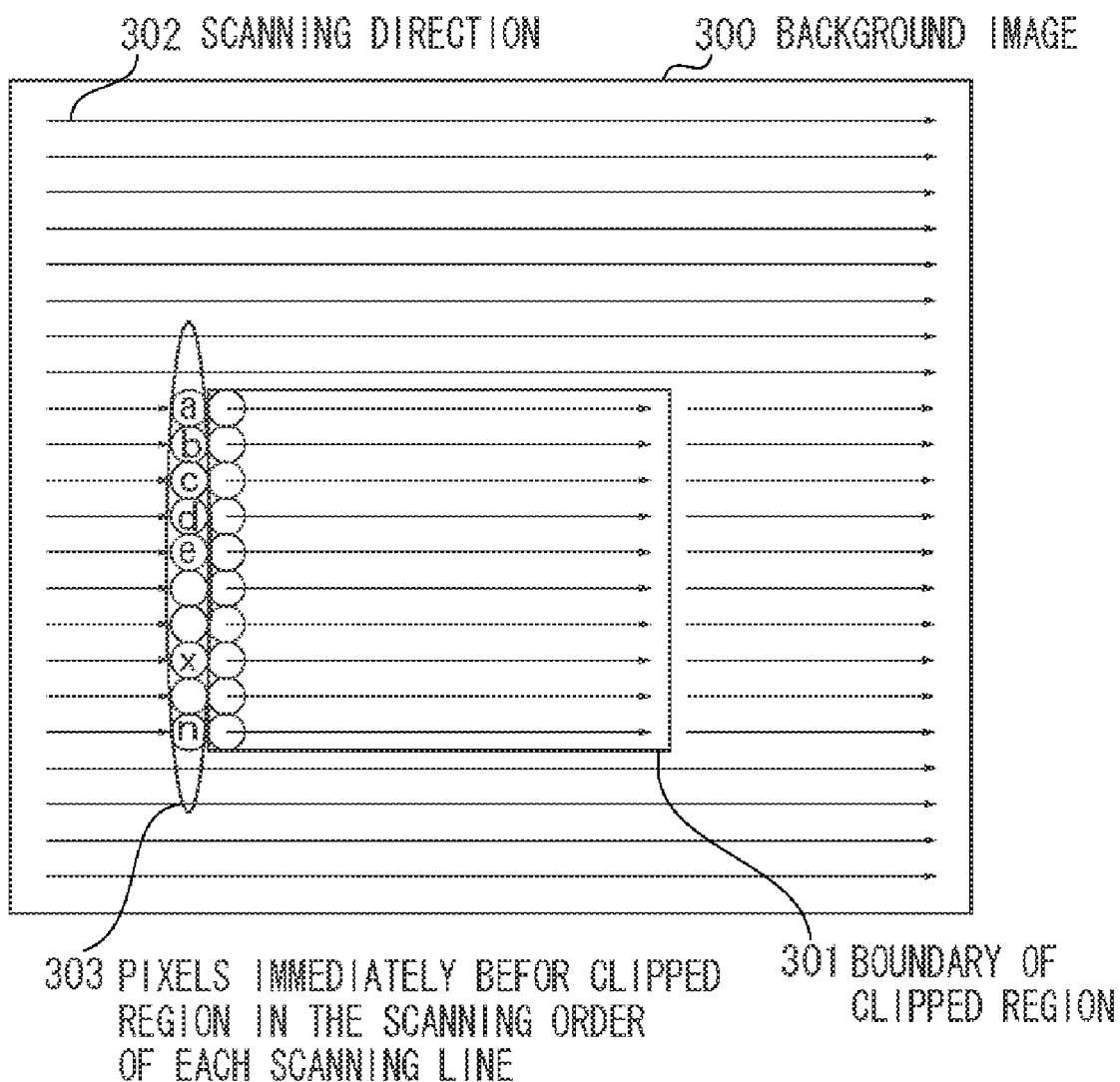
FIG. 3 illustrates a problem that the present invention aims to solve.

FIG. 2 is a block diagram illustrating a configuration of a major portion of the image processing apparatus illustrated in FIG. 1 according to the present exemplary embodiment. In FIG. 2, an image scanner 101 is connected to a bus 6 via an I/O interface 102. The image scanner 101 and the I/O interface 102 constitute the image input unit 10 (i.e., the image input unit 1 illustrated in FIG. 1).

A central processing unit (CPU) 20, a read-only memory (ROM) 30, a random access memory (RAM) 40, and a storage device 50 such as a hard disk are also connected to the bus 6. By the CPU 20 by executing a computer-executable program stored in the ROM 30 or the hard disk 50, the functions of the region division unit 21, the adjacent pixel region setting unit 22, the boundary region setting unit 23, the filling color generation unit 24, the filling unit 25, the adjacent pixel value writing unit 26, and the data output unit 5 illustrated in FIG. 1 are implemented.

The RAM 40 may be used as the work memory 42 and the image storage unit 43 illustrated in FIG. 1. The hard disk 502 is connected to the bus 6 via an I/O interface 501. The hard disk 502 and the I/O interface constitute the external storage unit 50. Further a printer 512 is connected to the bus 6 via an I/O interface 511. The printer 512 and the I/O interface 511 constitute the image output device 51.

A network I/F 52 is connected to an external network. The external storage unit 50, the image output device 51, and the network I/F 52 are the units to which the data output from the data output unit 5 in FIG. 1 is transmitted. Further, if an image data stored in the external storage unit 50 is input as data to be processed, then the external storage unit 50 may be regarded as an image input unit.

If image data transmitted from an external apparatus via a network is input as data to be processed, then the network I/F 52 may be regarded as an image input unit.

Next, processing flow of the exemplary embodiment of the present invention will be described referring to the flowchart illustrated in FIG. 6. In step S10, the image input unit 10 inputs a document image (color document image) as a processing object image. The input image data is stored in the work memory 42 that is secured as a predetermined region of the RAM 40. Then the image input processing ends.

In step S20, the region division processing of the document image that is input in step S10 is performed and the region information is extracted. The region division processing can be performed by using a publicly known technique (e.g., see Japanese Patent Application Laid-Open No. 2004-265384), and information of the object region is obtained. According to the present embodiment, a rectangle region including a photo image is extracted as an object region.

Then, image data of the object region is extracted from the input image and stored in the work memory 42. Further, the region information (i.e., information of the position and size of the object region) that is obtained by the region division processing is stored in a memory area (not illustrated) in the RAM 30, and then the processing of the region division ends.

Figure 4:
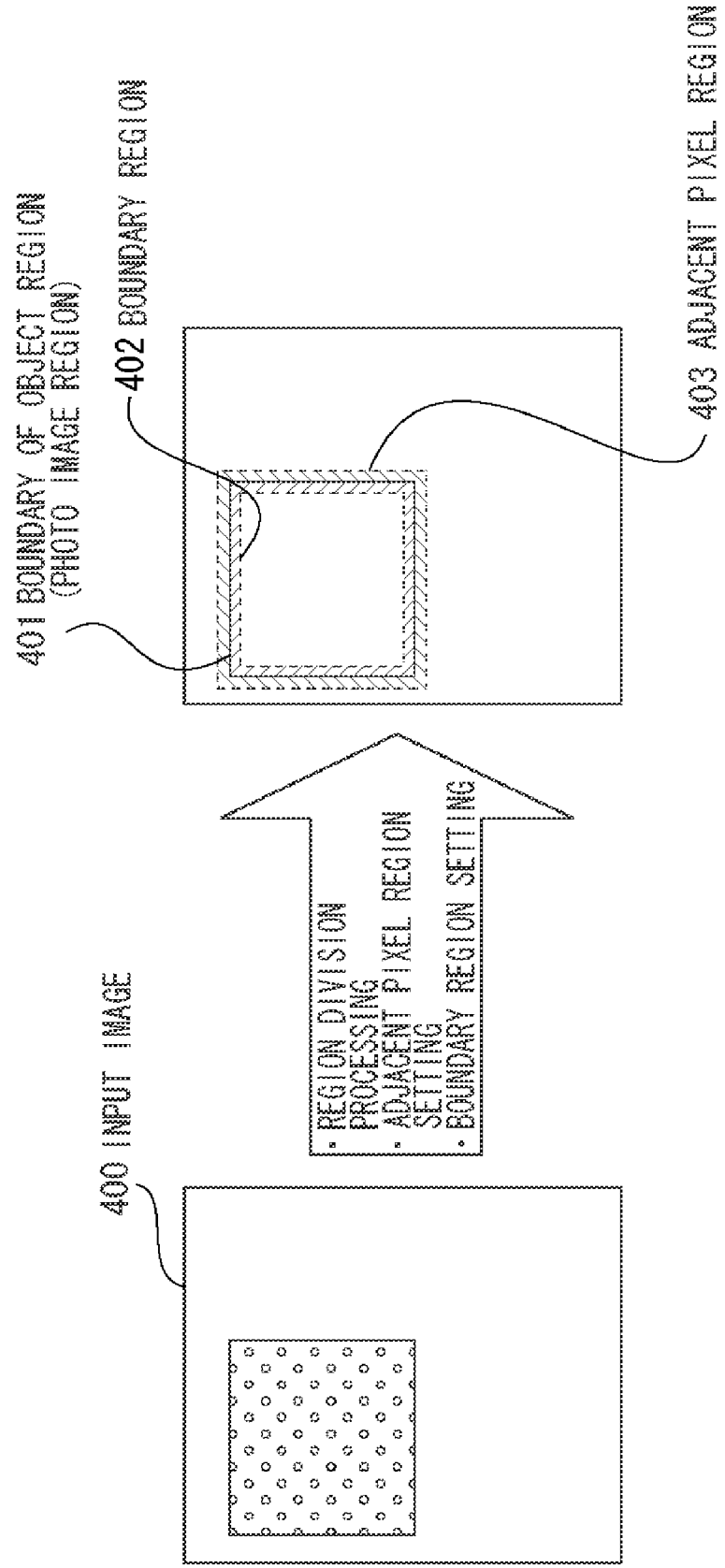
FIG. 4 illustrates a relation between an input image and an object region.

According to the example illustrated in FIG. 4, if the region division processing of an input image 400 is executed, then an object region such as a photo region is extracted, and position information of a boundary 401 of the object region (region information of the object region) will be obtained.

In step S30, an adjacent pixel region is set according to the region information of the object region obtained in step S20. The adjacent pixel region is an area that surrounds the object region. According to the example illustrated in FIG. 4, the region adjacent to the object region is set as an adjacent pixel region 403.

Figure 5:
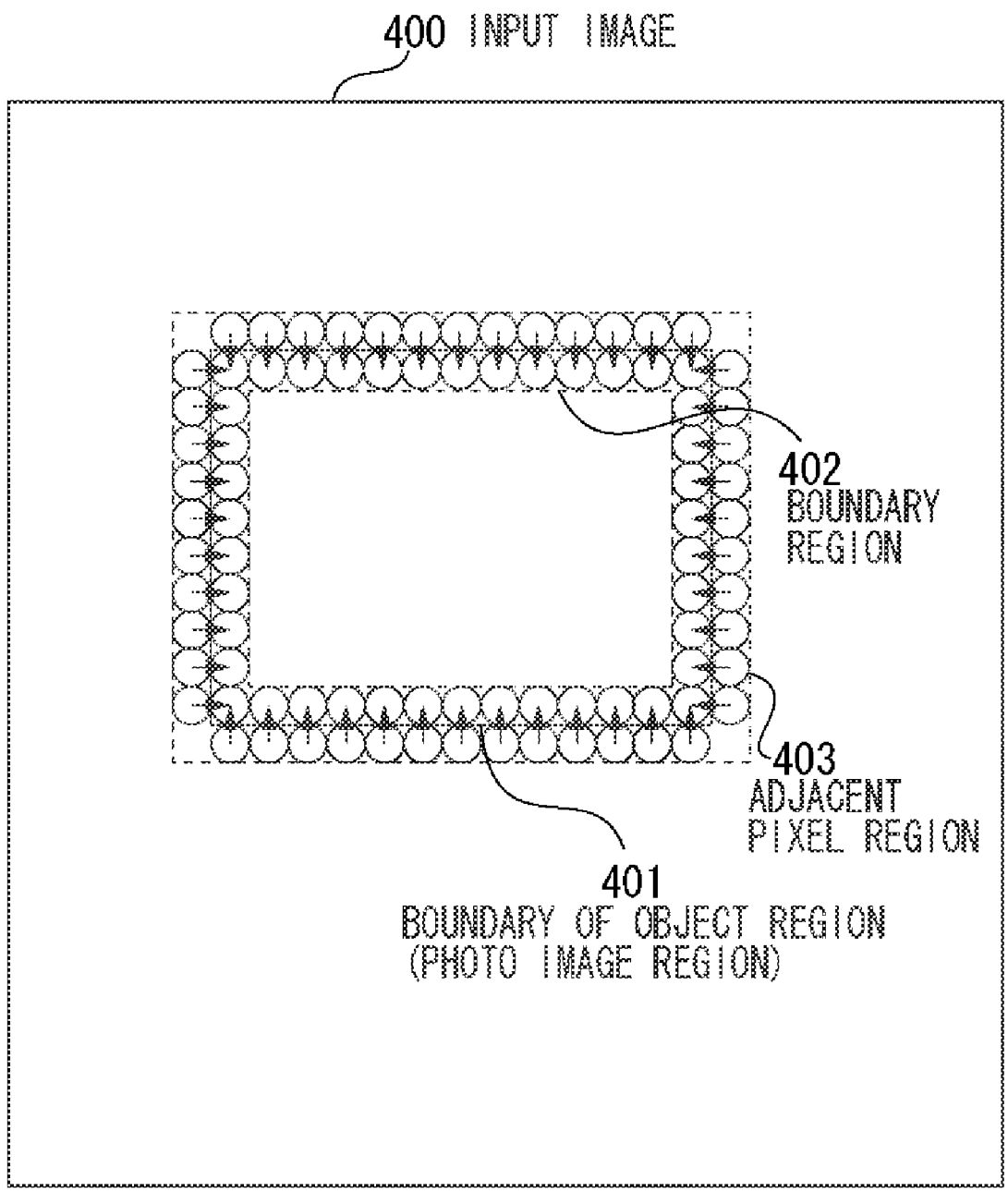
FIG. 5 illustrates details of the relation between the input image and the object region.

FIG. 5 is an enlarged view of the boundary 401 of the object region and the adjacent pixel region 403. In FIG. 5, " " each white circle indicates a pixel. The adjacent pixel region 403 surrounds the object region and has a width of one pixel. The region information of the adjacent pixel region is stored in a memory area of the RAM 30.

In step S40, a mean value of the pixel values of the pixels in the adjacent pixel region that is obtained in step S30 is calculated. The obtained average color is determined as the filling color. The filling color is used in filling the portion of the background image (input image) corresponding to the object region. In this way, the filling color is generated.

In step S50, the portion corresponding to the object region (photo image region) of the input image is filled with the filling color that is generated in step S40. In other words, according to the region information of the object region (photo image region) that is stored in step S20, a pixel value of the filling color is assigned to each pixel in the background image data and in the region corresponding to the object region with respect to the background image data that is stored in the image memory 43.

In step S60, by referring to the region information of the object region (photo image region) obtained in step S20, a boundary region having a width of a predetermined number of pixels is set at the inner side of the boundary of the object region. According to the example illustrated in FIG. 4, a region in the object region and adjacent to the boundary is set as a boundary region 402.

An enlarged view of the boundary 401 of the object region and the boundary region 402 is illustrated in FIG. 5. In FIG. 5, each white circle indicates a pixel. The boundary region 402 is set at the inner side of the boundary of the object region and has a width of one pixel. The region information of the boundary region is stored in the memory area of the RAM 30.

In step S70, the pixel value of each pixel in the adjacent pixel region that is set in step S30 is written as a pixel value for each corresponding pixel in the boundary region set in step S60. In other words, as illustrated in FIG. 5, the pixel value of each pixel in the adjacent pixel region 403 is assigned to a neighboring pixel beyond the boundary 401 in the boundary region 402.

To be more precise, a pixel value of each pixel in the adjacent pixel region 403, which is on the left side of the region boundary, is assigned to the pixel directly on the right side and in the boundary region 402. A pixel value of each pixel in the adjacent pixel region 403, which is on the lower side of the region boundary, is assigned to the pixel directly on the upper side and in the boundary region 402.

Further, a pixel value of each pixel in the adjacent pixel region 403, which is on the right side of the region boundary, is assigned to the pixel directly on the left side and in the boundary region 402. Furthermore, a pixel value of each pixel in the adjacent pixel region 403, which is on the upper side of the region boundary, is assigned to the pixel directly on the lower side and in the boundary region 402.

After undergoing the processing described above, with respect to the background image (input image), each pixel in the boundary region 402 is assigned a pixel value that is equal to that of the adjacent pixel in the boundary region 403, and the pixels in the region surrounded by the boundary region 402 is filled with pixels having a mean value of the pixels in the adjacent pixel region 403.

In step S80, the image data of the object region (photo image region) obtained in step S20 and the background image data, which is obtained through the color filling processing and the adjacent pixel value writing processing performed in steps S30 to S70, are output. At this time, the data is output as a document file having a layered data structure such that the image data of the object region is displayed over the background image data. The data is output, for example, in a PDF format.

Further, at this time, it is preferable that data of the background image and the image data of the object region are compressed using an appropriate compression method before the data is stored. For example, it is preferable to use JPEG compression for the background image, and further, JPEG compression for the object region if the image is a photo image, and MMR compression if the image is a character image.

According to the first exemplary embodiment, a boundary region is set at the inner side of the object region in the background image, and each pixel in the boundary region is assigned a pixel value that equals the value of the pixel directly adjacent to and on the outer side of that pixel. Thus, even if a difference of one pixel is detected between the background image and the object image when the document file is displayed, since a pixel value of a pixel directly adjacent to and on the outer side of the object region is assigned to the pixels in the boundary region, noise due to average color does not occur.

Further, with respect to the object region of the background image, since the region surrounded by the boundary region is filled with one average color, streaks are not produced in the object region. Further, compression efficiency of the color document image will be increased.

Figure 6:
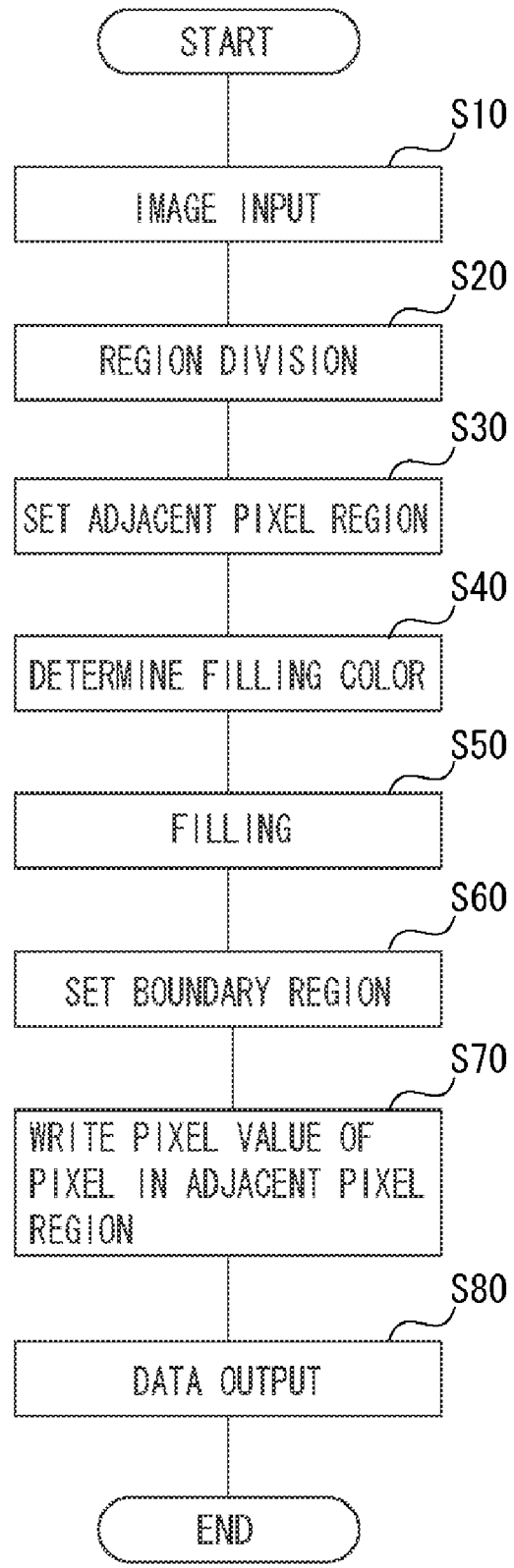
FIG. 6 is a flowchart illustrating flow of processing according to an exemplary embodiment of the present invention.

With respect to the processing flow that is described referring to FIG. 6 according to the above-described first exemplary embodiment, the setting of the boundary region in step S60 is not limited to after the filling processing in step S50. In other words, the boundary region can be set at any timing so long as it is after the region division processing performed in step S20 and before the adjacent pixel value writing processing in step S70.

For example, after the region division processing is performed and the adjacent pixel region and the boundary region are set, the region surrounded by the boundary region may be filled with a filling color, and the pixel values of the adjacent pixel region may be assigned to the boundary region.

According to the first exemplary embodiment, the width of the boundary region is described as one pixel as illustrated in FIG. 5, however the width is not limited to one pixel. For example, the width of the boundary region can be set to two pixels. In this case, the pixel value of a pixel in the adjacent pixel region is assigned to two pixels in the boundary region.

If the width of the boundary region is increased, the area to be filled with the average color becomes smaller. When the generated document file is enlarged or reduced before it is displayed, however, possibility of the false color is decreased even if the difference between the regions is displayed larger. Generally, enlargement/reduction of an image based on bi-linear interpolation uses pixel values of 2×2 pixels neighboring an interpolation point. On the other hand, scaling based on bi-cubic interpolation uses pixel values of 4×4 pixels neighboring an interpolation point.

Thus, it is preferable to set the pixel width of the boundary region to one pixel or more if the application used for displaying or editing is based on the bi-linear interpolation, and two pixels or more if the application is based on the bi-cubic interpolation. In other words, the pixel width is preferably determined according to the type of interpolation method that is used in the enlargement/reduction of the image.

However, if the width of the boundary region is too wide, then the region will be full of streaks that go from the region boundary to the center of the image (i.e., streaks from left, right, up, and bottom of the region boundary to the center), thus it is preferable not to make the width of the boundary wider than necessary.

Further, the filling processing and the adjacent pixel value writing processing can be performed after lowering the resolution of the background image according to the first exemplary embodiment. In this case, before lowering the resolution of the background image, image data of an important object region is extracted by the region division processing.

For example, with respect to an image having an input resolution of 300 dpi, while the resolution of the image of the object region is maintained at 300 dpi, the resolution of the background image may be lowered to 150 dpi. In this case, since the important objects are extracted in advance, even if the resolution of the background image is lowered, the fact that the resolution is lowered is not noticeable, and the data amount can be greatly reduced.

According to the first exemplary embodiment, the input image is described based on the assumption that the color components of the color image have a same resolution. However, the present invention is not limited to such a case. In other words, an image that is obtained by decomposing a color image into a brightness component (Y) and color difference components (Cr and Cb), and then lowering the resolution of a color difference component may be used as the image to be processed.

For example, processing according to the present invention can also be applied to an image whose ratio of the pixel numbers of each color component is, for example, Y:Cr:Cb=4:1:1, and resolution of at least one color component is low.

In other words, each color component is processed according to the process flow described in the above-described exemplary embodiment. Then, the assigning processing of the adjacent pixel value of a color component of high resolution will be performed by setting a boundary region having a width corresponding to a pixel width of the boundary region with respect to a low resolution image, and then the writing processing of the adjacent pixel value is performed.

For example, in a case of a Y:Cr:Cb=4:1:1 image, the resolution of the Cr component image and the Cb component image is half the resolution of the Y component image. Thus, if the width of the boundary region of the Cr component image and the Cb component image is one pixel as is the boundary region in FIG. 5, then the width of the boundary region of the Y component image will be set to twice the width of the boundary region of the Cr component image and the Cb component image (i.e. width of two pixels). Then, the pixel value of the adjacent region is assigned to two pixels in the boundary region.

Accordingly, resolution of a color component can be lowered, the data amount can be reduced, and noise due to average color can be prevented.

According to the first exemplary embodiment, in step S80, the background image and the image data of the object region are compressed by a compression method (JPEG compression or MMR compression) appropriate for each image, and then converted into a document file in PDF format. Instead of performing JPEG compression or MMR compression of the image in the object region, the image may be converted into data of a different data format for data compression.

For example, if the object region is an illustration image region or a text region, then the data amount can be reduced by converting the data of the illustration image region or the text region into vector data.

According to the above-described exemplary embodiments, a computer functions as each of the processing units illustrated in FIG. 1 by the computer executing a computer-executable program, however, the present invention is not limited to such an example. For example, a part (or whole) of the processing can be realized by an electronic circuit or a function expansion unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-324476 filed Dec. 19, 2008, which is hereby incorporated by reference herein in its entirety.

What is claimed is:

1. An image processing apparatus comprising:
a region division unit configured to extract an object region from an input image;
a filling color generation unit configured to generate a filling color of the object region;
a filling unit configured to perform filling processing of the object region of the input image using the generated filling color;
a boundary region setting unit configured to set a boundary region at an inner side of a boundary of the object region of the input image;
an adjacent pixel value writing unit configured to write a pixel value of an adjacent pixel at an outer side of the boundary of the object region to a corresponding pixel in the boundary region; and
an output unit configured to output a document file having a data structure including the input image having the pixel value of the adjacent pixel written to each pixel in the boundary region and having a pixel value of the filling color written to each pixel in a region set at the inner side of the boundary region and an image of the object region.

2. The image processing apparatus according to claim 1, wherein the boundary region has a predetermined pixel width.

3. The image processing apparatus according to claim 2, wherein the predetermined pixel width is either a width of one pixel or a width of two pixels.

4. The image processing apparatus according to claim 2, wherein the predetermined pixel width is determined according to an interpolation method used for enlargement or reduction.

5. The image processing apparatus according to claim 1, further comprising an adjacent pixel region setting unit configured to set an adjacent pixel region at the outer side of the boundary of the object region of the input image, and
wherein the filling color generation unit calculates a mean value of pixel values of pixels included in the adjacent pixel region set by the adjacent pixel region setting unit, and generates the mean value as the filling color.

6. The image processing apparatus according to claim 1, wherein the output unit performs compression processing of the input image having the pixel value of the adjacent pixel written to each pixel in the boundary region and having the pixel value of the filling color written to each pixel of the region at the inner side of the boundary region, and the image of the object region, and outputs the document file including data of a result of the compression processing.

7. The image processing apparatus according to claim 1, wherein the input image included in the document file is an image of which resolution is reduced.

8. The image processing apparatus according to claim 1, wherein out of a plurality of color components that configure the input image, resolution of at least one color component is lower than other color components, and
wherein the adjacent pixel value writing unit performs processing for each of the plurality of color components of the input image, and a boundary region to which writing processing of an adjacent pixel value of a high resolution color component is performed is determined based on a pixel width in a boundary region of a low resolution color component.

9. The image processing apparatus according to claim 1, wherein the object region is a photo image region.

10. An image processing method comprising:
extracting an object region from an input image;
generating a filling color of the object region;
filling the object region of the input image using the generated filling color;
setting a boundary region at an inner side of a boundary of the object region of the input image;
writing a pixel value of an adjacent pixel at an outer side of the boundary of the object region to a corresponding pixel in the boundary region; and
outputting a document file having a data structure including the input image having the pixel value of the adjacent pixel written to each pixel in the boundary region and having a pixel value of the filling color written to each pixel in a region set at the inner side of the boundary region and an image of the object region.

11. A non-transitory computer-readable storage medium storing a program for causing a computer to function as units, the units comprising:
a region division unit configured to extract an object region from an input image;
a filling color generation unit configured to generate a filling color of the object region;
a filling unit configured to perform filling processing of the object region of the input image using the generated filling color;
a boundary region setting unit configured to set a boundary region at an inner side of a boundary of the object region of the input image;
an adjacent pixel value writing unit configured to write a pixel value of an adjacent pixel at an outer side of the boundary of the object region to a corresponding pixel in the boundary region; and
an output unit configured to output a document file having a data structure including the input image having the pixel value of the adjacent pixel written to each pixel in the boundary region and having the pixel value of the filling color written to each pixel in a region set at the inner side of the boundary region and an image of the object region.

* * * * *